(12) United States Patent
Yan

(10) Patent No.: US 10,514,695 B2
(45) Date of Patent: Dec. 24, 2019

(54) DRIVER ASSISTING SYSTEM

(71) Applicant: DENSO International America, Inc., Southfield, MI (US)

(72) Inventor: Yu Yan, Livonia, MI (US)

(73) Assignee: DENSO International America, Inc., Southfield, MI (US)

(\*) Notice: Subject to any disclaimer, the term of this patent is extended or adjusted under 35 U.S.C. 154(b) by 237 days.

(21) Appl. No.: 15/813,209

(22) Filed: Nov. 15, 2017

(65) Prior Publication Data

US 2019/0146495 A1    May 16, 2019

(51) Int. Cl.
 *B60W 40/09*  (2012.01)
 *G05D 1/00*  (2006.01)
 *G05D 1/02*  (2006.01)
 *G06K 9/00*  (2006.01)

(52) U.S. Cl.
 CPC ........... *G05D 1/0088* (2013.01); *B60W 40/09* (2013.01); *G05D 1/0061* (2013.01); *G05D 1/0223* (2013.01); *G06K 9/00798* (2013.01); *B60W 2540/22* (2013.01); *B60W 2550/22* (2013.01); *G05D 2201/0213* (2013.01)

(58) Field of Classification Search
 CPC ............. B60W 40/09; B60W 2540/22; B60W 2550/22; G05D 1/0061; G05D 1/0088; G05D 1/0223; G05D 2201/0213; G06K 9/00798; G06K 9/00845
 See application file for complete search history.

(56) References Cited

U.S. PATENT DOCUMENTS

| | | | |
|---|---|---|---|
| 5,303,159 A | 4/1994 | Tamai et al. | |
| 6,950,746 B2 | 9/2005 | Yano et al. | |
| 2015/0142244 A1 | 5/2015 | You et al. | |
| 2018/0118219 A1\* | 5/2018 | Hiei | B60W 40/09 |
| 2018/0141568 A1\* | 5/2018 | Singhal | B62D 15/00 |

\* cited by examiner

*Primary Examiner* — Jerrah Edwards

(57) ABSTRACT

A driver assisting system for a vehicle that is capable of operating in an autonomous drive mode and a manual drive mode is provided. The driver assisting system includes: an autonomous drive apparatus that controls the vehicle during the autonomous drive mode; a navigation apparatus; a detector that obtains information associated with an eagerness of the driver; an eagerness determiner that determines; and a controller that switches between the autonomous drive mode and the manual drive mode. The navigation apparatus is configured to initially suggest an original route, suggest an alternative route, and suggest a fastest route when the vehicle deviates from the original route and the eagerness determiner determines that the driver is in the high eagerness state. The controller is configured to set the autonomous drive mode, maintain the autonomous drive mode, and switch to the manual drive mode.

8 Claims, 4 Drawing Sheets

US 10,514,695 B2

DRIVER ASSISTING SYSTEM

TECHNICAL FIELD

The present disclosure relates to a technology that recalculates a route by a navigation apparatus installed in a vehicle capable of autonomous driving.

BACKGROUND

When a driver uses a navigation apparatus of a vehicle, the driver initially inputs a destination position to a navigation apparatus. The navigation apparatus generates a route from a current position to the inputted destination position. After starting to drive, the navigation apparatus instructs route guidance (for example, instructions such as turning right, turning left, go straight) based on the route. However, the driver may not follow the route guidance. That is, the vehicle may deviate from the route in some cases. For example, when the vehicle drives on a freeway, the driver may miss an exit guided by the navigation apparatus due to difficulty of lane change by traffic congestion. In this case, the navigation apparatus may recalculate a new route to the destination position, and generates an alternative route guides to a new exit. The navigation apparatus provides new route guidance to the driver. However, the newly suggested exit may be inappropriate for the driver in a certain condition such as too close, congested traffic, construction work. The driver may miss it again due to situations at the time of recalculation such as driving at high speed, surrounding environment.

A vehicle capable of performing an autonomous drive has an autonomous drive apparatus. In the vehicle capable of performing an autonomous drive (an autonomous drive vehicle), the driver inputs his/her destination at the start of using the autonomous drive apparatus or at a time when the driver wants to use the autonomous drive apparatus. The navigation apparatus may calculate and generate a route (referred to as an original route in the present application) and provides route guidance to the autonomous drive apparatus. When the vehicle starts an autonomous drive mode, the autonomous drive apparatus controls speed, steering operation, blinker or the like of the vehicle based on the route guidance.

As similar to the above case when the driver drives the vehicle in accordance with the route guidance of the navigation apparatus, the vehicle during the autonomous drive mode may deviate from the route guidance. That is, the vehicle during the autonomous drive mode may not leave a freeway through an exit guided by the navigation apparatus due to congested traffic, construction work, or the like. In this case, the navigation apparatus may recalculate a new route (referred to as an alternative route in the present application) based on the current position and the destination position by considering execution of the autonomous drive mode. In other words, the navigation apparatus may generate the alternative route in a premise that the vehicle remains the autonomous drive mode. However, the alternative route may be inappropriate for the driver who be in a hurry. In addition, the vehicle during the autonomous drive mode may not go along the alternative route due to a condition such as congested traffic, construction work. In that situation, the drive during the autonomous drive mode may recalculate again. When the vehicle during the autonomous drive mode keeps missing exits on a freeway, a time may be consumed much more than a case where the driver drives the vehicle.

SUMMARY

It is an object of the present disclosure to provide a driver assisting system, which is capable of recalculating a route more intelligently when a subject vehicle in an autonomous drive mode has gone off an original route.

According to one aspect of the present disclosure, a driver assisting system for a vehicle that is capable of operating in an autonomous drive mode and a manual drive mode is provided. The driver assisting system includes: an autonomous drive apparatus that controls the vehicle during the autonomous drive mode; a navigation apparatus that guides to a driver a route to a destination; a detector that obtains information associated with an eagerness of the driver to arrive at the destination; an eagerness determiner that determines whether the driver is in a predetermined high eagerness state based on the information obtained by the detector; and a controller that switches between the autonomous drive mode in which the autonomous drive apparatus drives the vehicle and the manual drive mode in which the driver drives the vehicle. The navigation apparatus is configured to (i) suggest an original route when the driver sets the destination, (ii) suggest an alternative route with a first estimated arrival time when the vehicle deviates from the original route and the eagerness determiner determines that the driver is not in the predetermined high eagerness state, and (iii) suggest a fastest route with a second estimated arrival time, which is equal to or earlier than the first estimated arrival time, when the vehicle deviates from the original route and the eagerness determiner determines that the driver is in the predetermined high eagerness state. The controller is configured to (i) set the autonomous drive mode when the vehicle travels along the original route, (ii) maintain the autonomous drive mode when the vehicle deviates from the original route and the eagerness determiner determines that the driver is not in the predetermined high eagerness state, and (iii) switch to the manual drive mode when the vehicle deviates from the original route and the eagerness determiner determines that the driver is in the predetermined high eagerness state.

According to the driver assisting system, it may be possible to recalculate a route more intelligently when the subject vehicle drives in the autonomous drive mode. In addition according to the driver assisting system, it may be possible to improve convenience for the driver.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION (First Embodiment)

A configuration of a driver assisting system 100 according to the present disclosure will be described with reference to FIG. 1, FIG. 2, FIG. 3, and FIG. 4.

A subject vehicle is an autonomous drive vehicle. The subject vehicle of the present disclosure is capable of autonomously driving in an autonomous drive mode (AD mode). In the AD mode, once the driver sets a destination position, an autonomous drive apparatus 2 of the driver assisting system 100 controls the subject vehicle without operation by the driver.

In the present embodiment, the autonomous drive apparatus 2 may fully control the subject vehicle without any operation of the driver (that is, human), and may partially control the vehicle with inputs from the driver. By contrast, in a manual driver mode (MD mode), the autonomous drive apparatus 2 does not operate the subject vehicle and the driver manually controls the subject vehicle. In this case, the subject vehicle may provide a passive safety assistance system and/or an active safety assistance system.

Figure 1:
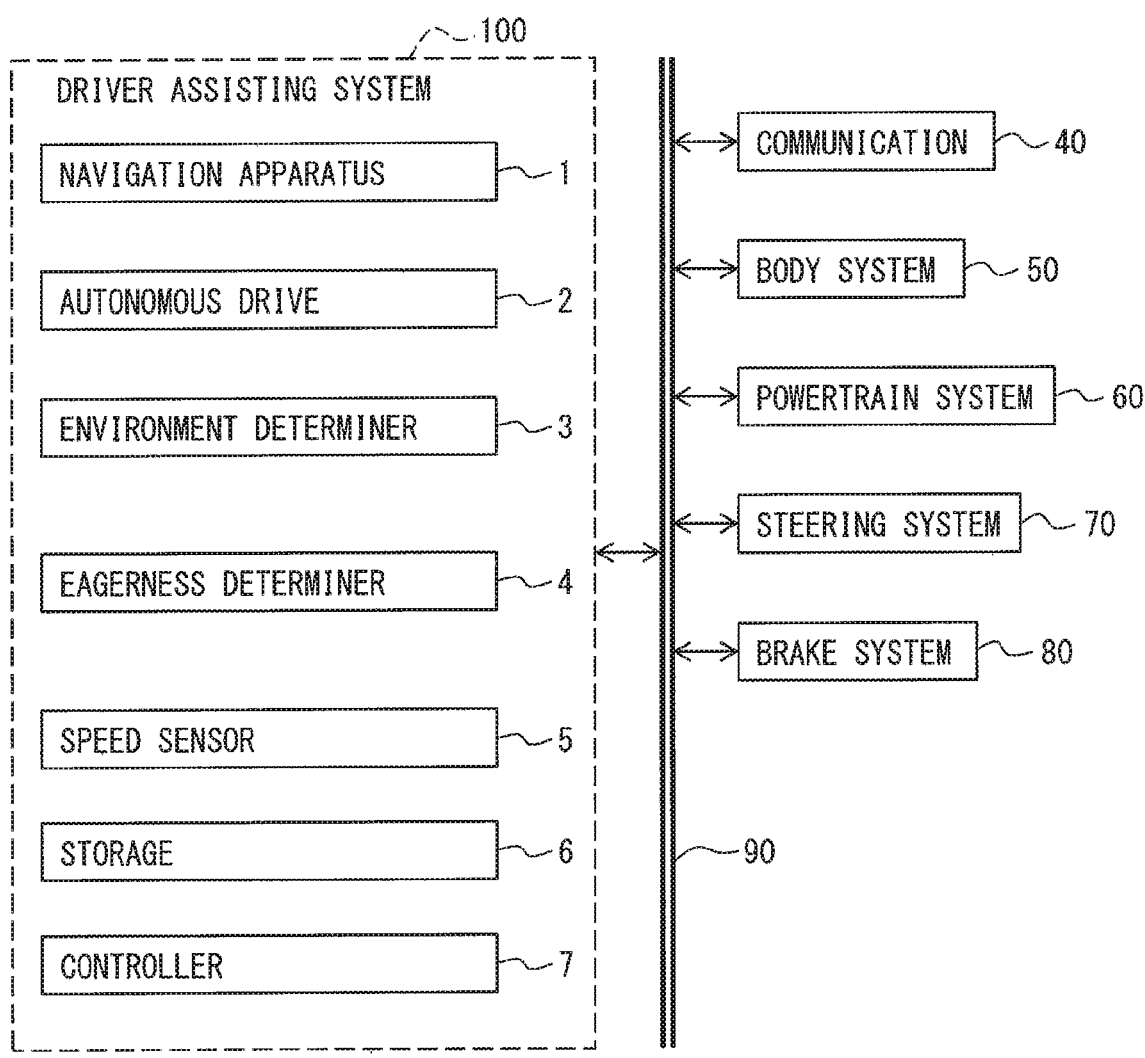
FIG. 1 is a diagram schematically illustrating an overall configuration of a driver assisting system and another related components and systems.
Figure 2:
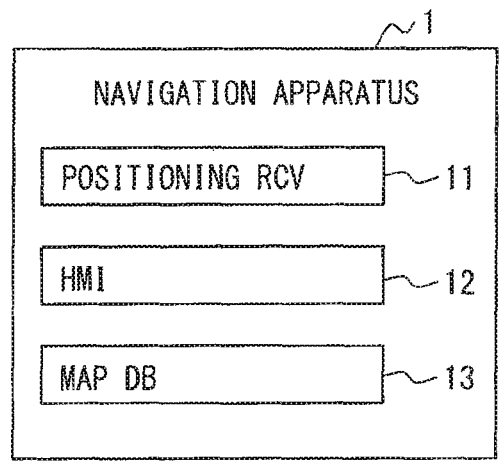
FIG. 2 is a diagram illustrating a configuration of the navigation apparatus.
Figure 3:
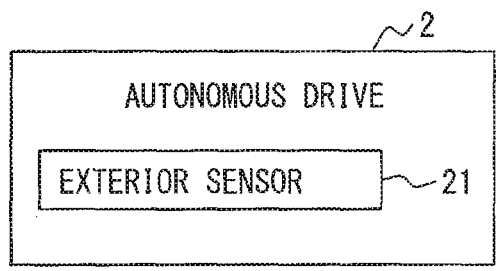
FIG. 3 is a diagram illustrating a configuration of the autonomous drive apparatus.
Figure 4:
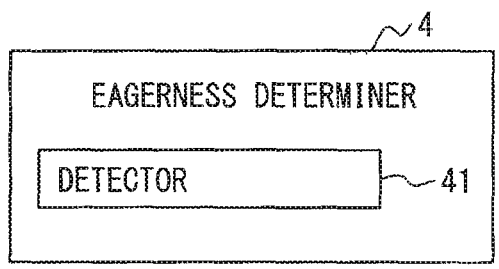
FIG. 4 is a diagram illustrating a configuration of the eagerness determiner.

As shown in FIG. 1, the subject vehicle according to the present disclosure includes a driver assisting system 100 and may include other components and systems such as a communication portion 40, a body system 50, a powertrain system 60, a steering system 70, and a brake system 80, and an in-vehicle local area network (LAN) 90.

(Configuration of the Driver Assisting System)

The driver assisting system 100 generally includes a navigation apparatus 1, an autonomous drive apparatus 2, and an eagerness determiner 4. The navigation apparatus 1 includes a positioning receiver 11, a human machine interface 12, and a map database 13. The autonomous drive apparatus 2 includes an exterior sensor 21, a surrounding environment determiner 3. The eagerness determiner 4 includes a detector 41, a vehicle speed sensor 5, a storage 6 storing programs, and a controller 7.

The navigation apparatus 1 guides to the driver a route to the destination position. The navigation apparatus 1 receives a destination position of the driver through the human machine interface 12, and obtains positional information from the positioning receiver 11. The navigation apparatus 1 calculates a route from the current position to the destination position based on information stored in the map database 13, and generates route guidance based on the calculated route. The driver may input the destination position in advance through a smartphone, PC, PDA or the like. The smartphone or the like may transmit the destination position to the navigation apparatus 1 through wireless connection or wired connection. The navigation apparatus 1 receives the input destination position through the communication portion 40. Incidentally, it is not limited that the destination position is directly transmitted from the smartphone to the navigation apparatus 1. The smartphone may upload the destination position of the driver to an external server once, and the external server may transmit the destination position to the navigation apparatus 1.

The positioning receiver 11 detects the current position of the subject vehicle. Specifically, the positioning receiver 11 receives positioning signals with antenna (not shown), and calculates coordinates (longitude, latitude, altitude) of the current position based on the received signals. The positioning system may be a satellite positioning system such as GPS, QZSS, GLONASS, Galileo, IRNSS, Beidou.

The human machine interface 12 includes an interface such as a display (for example, a liquid crystal display, an organic electro luminescence display, a touch panel display), a speaker, a microphone, a switch, a button, or the like. The driver inputs, through the human machine interface 12, input items such as the name of a destination position, a desired arrival time at which the driver wishes to or needs to arrive at the destination position, a schedule, a departure position, an eagerness level of the driver. The driver may input these items through voice of the driver or through the smartphone or the like. The human machine interface 12 may provide information to the driver, and may notify the driver of various information such as a deviation from the route and start of recalculation, a determination result of each of a surrounding environment determination process, a speed check process, an eagerness determination process, a change of a driving mode from the AD mode to the MD mode, a change of a driving mode from the MD mode to the AD mode.

The map database 13 stores map data for calculating a route and for displaying map. The map data may include a map matching data, a road data such as connection relation information between a link (corresponding to road) and a node (corresponding to intersection, crossroad, a branching point, an exit of freeway, or the like), positional information of a link and a node, facility data having positional information of a facility and landmark. In addition, the map database 13 stores information of road characteristics such as a road shape, a drive lane, a road width. The map database 13 may also store traffic regulatory information specified from traffic information obtained through the communication part 40 or any kind of wireless broadcasting or communication.

The autonomous drive apparatus 2 controls the subject vehicle during the AD mode, and guides the subject vehicle to the destination position along the route by controlling the body system 50, the powertrain system 60, the steering system 70, and the brake system 80 or the like during the AD mode.

When the autonomous drive apparatus 2 controls the subject vehicle during the AD mode, the autonomous drive apparatus 2 controls the vehicle so as to trace the route. In order to set the route, the driver sets the destination position to the navigation apparatus 1 through the human machine interface 12 or the like. The navigation apparatus 1 determines the route from the departure position (for example, a current position) to the destination position, as route guidance, and the navigation apparatus 1 notifies the autonomous drive apparatus 2 of the route guidance. With this, the autonomous drive apparatus 2 controls the subject vehicle to travel along the route guidance of the route (hereinafter, referred to as a route instead of route guidance, for the sake of simplicity).

In the present embodiment, a route generated by the navigation apparatus 1 when the driver initially inputs the destination position, or a route generated upon starting drive may be referred to as an original route. Therefore, when starting the AD mode, the autonomous drive apparatus 2 guides the subject vehicle go along the original route toward the destination position.

The autonomous drive apparatus 2 monitors an environment around the vehicle with use of the exterior sensor 21 attached to the subject vehicle, so that the autonomous drive apparatus 2 detects road conditions around the subject vehicle such as another vehicle, a drive lane, an object, a road shape. The autonomous drive apparatus 2 selects an optimal vehicle speed, an optimal drive lane, an optimal position in a drive lane based on of the road conditions detected by the exterior sensor 21 and map data stored in the map database 13 while securing safety so as to execute an autonomous drive control.

The exterior sensor 21 includes a camera (a surrounding monitoring camera), a radar sensor, or the like. The exterior sensor 21 detects a drive lane where the subject vehicle is driving and an adjacent drive lane adjacent to the current drive lane, and an object along a traveling direction of the subject vehicle. A radar sensor may be a millimeter wave sensor, LIDAR (light detection and ranging/laser imaging detection and ranging), a sound wave sensor. Any kind of range sensor may be used as long as a range sensor detects a direction of an object and a distance to the object. The radar sensor transmits the obtained data to the environment determiner 3 or the like through the in-vehicle LAN 90, in addition to the autonomous drive apparatus 2.

The surrounding environment determiner 3 receives information from the exterior sensor 21 to determine the surrounding environment, and performs the surrounding environment determination process. That is, the surrounding environment determiner 3 determines whether the surrounding environment (in other words, road conditions) is suitable for drive operation such as lane change of the subject vehicle.

The eagerness determiner 4 determines whether the driver is in a predetermined high eagerness state based on the information obtained by the detector 41. In other words, the eagerness determiner 4 determines how much the driver wants to arrive at the destination position by performing an eagerness determination process based on information from the detector 41. The eagerness determiner 4 sends a determination result to the navigation apparatus 1.

The detector 41 obtains information associated with an eagerness of the driver to arrive at the destination position. In the first embodiment, the detector 41 of the eagerness determiner 4 receives the desired arrival time inputted by the driver through the human machine interface 12. It is supposed that the driver wants to arrive at the destination position by the desired arrival time. Instead of the input of the desired arrival time, a driver may input a specific name from which a desired arrival time can be estimated. For example, the specific name may be an event name, a flight number, or the like. In this case, the navigation apparatus 1 communicates the external server through the Internet with use of the communication portion 40 and obtain information of time based on the inputted specific name.

The vehicle speed sensor 5 detects a speed of the subject vehicle to transmit to the navigation apparatus 1 and the autonomous drive apparatus 2.

The storage 6 may include a semiconductor memory such as RAM, ROM, a flash memory or the like, and is an example of a non-transitory computer readable medium. Various operations of the driver assisting system 100 may be carried out by executing programs stored in the storage 6.

The controller 7, the autonomous drive apparatus 2, the navigation apparatus 1, the environment determiner 3, the eagerness determiner 4 execute a route recalculation process in cooperation. Especially, the controller 7 switches between the AD mode and the MD mode. The route recalculation process operates when the subject vehicle starts the AD mode and executes the AD mode. During the AD mode, the controller 7 of the driver assisting system 100 operates the route recalculation process.

The communication part 40 includes a wireless communication device (not shown), which performs wireless communication between a vehicle and a vehicle, and between a vehicle and infrastructure such as an on-road device, a data center. The body system 50 includes, for example, an door lock system, a headlight, a turn signal light, and has various functions such as a lock/unlock control of the door lock system, a lighting control of the headlight and the turn signal light. The powertrain system 60 includes, for example, an engine, transmission, drive shafts, differentials, and drive wheels. The steering system 70 includes, for example, a steering shaft, column, rack, and pinion. The brake system 80 has various functions for controlling a brake operation of the subject vehicle.

The driver assisting system 100, the communication portion 40, the body system 50, the powertrain system 60, the steering system 70, and the brake system 80 can communicate with each other through the in-vehicle LAN 90 so as to exchange data with each other.

(Route Recalculation Process)

Figure 5:
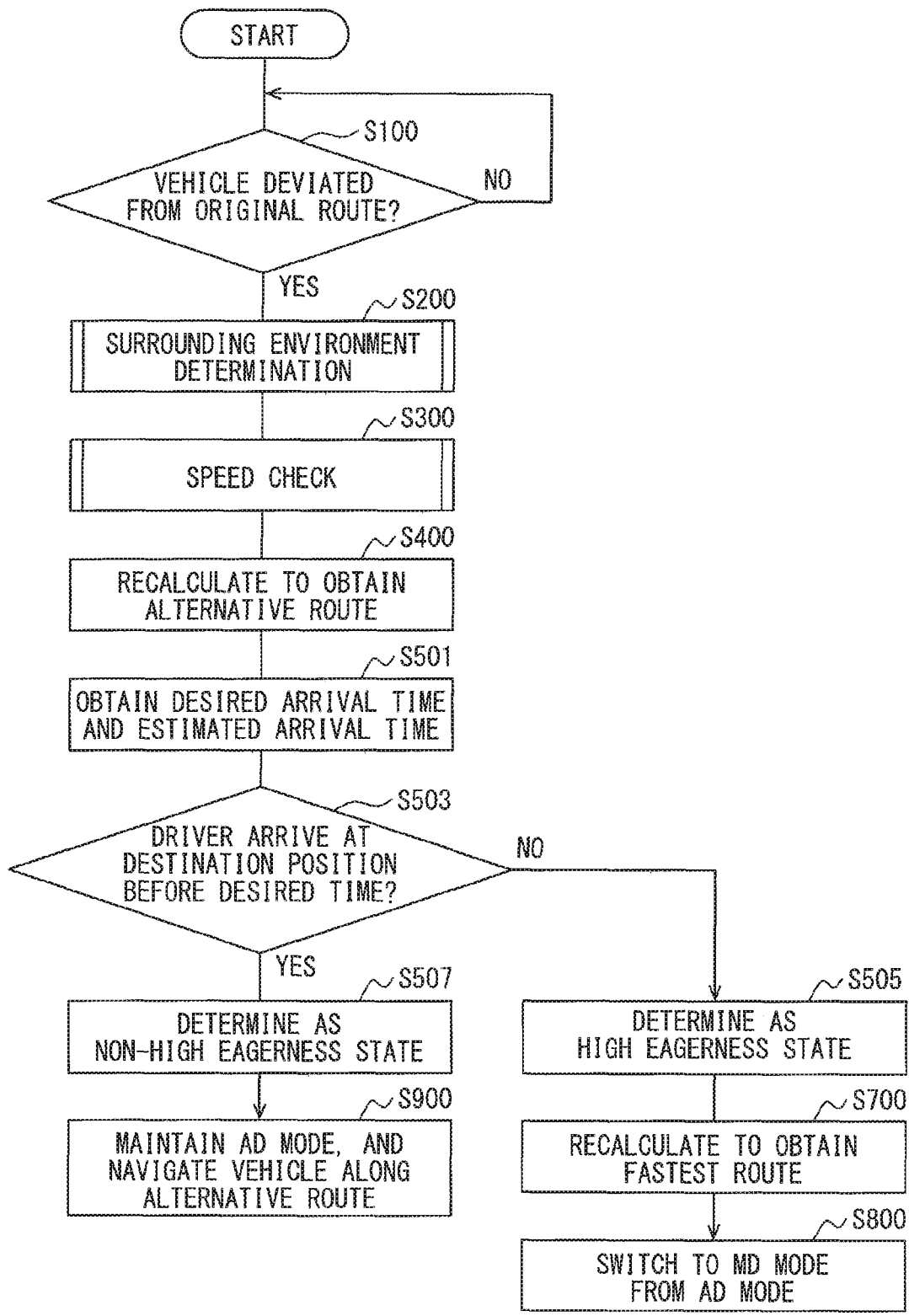
FIG. 5 is a flowchart illustrating a route recalculation process of a first embodiment.
Figure 6:
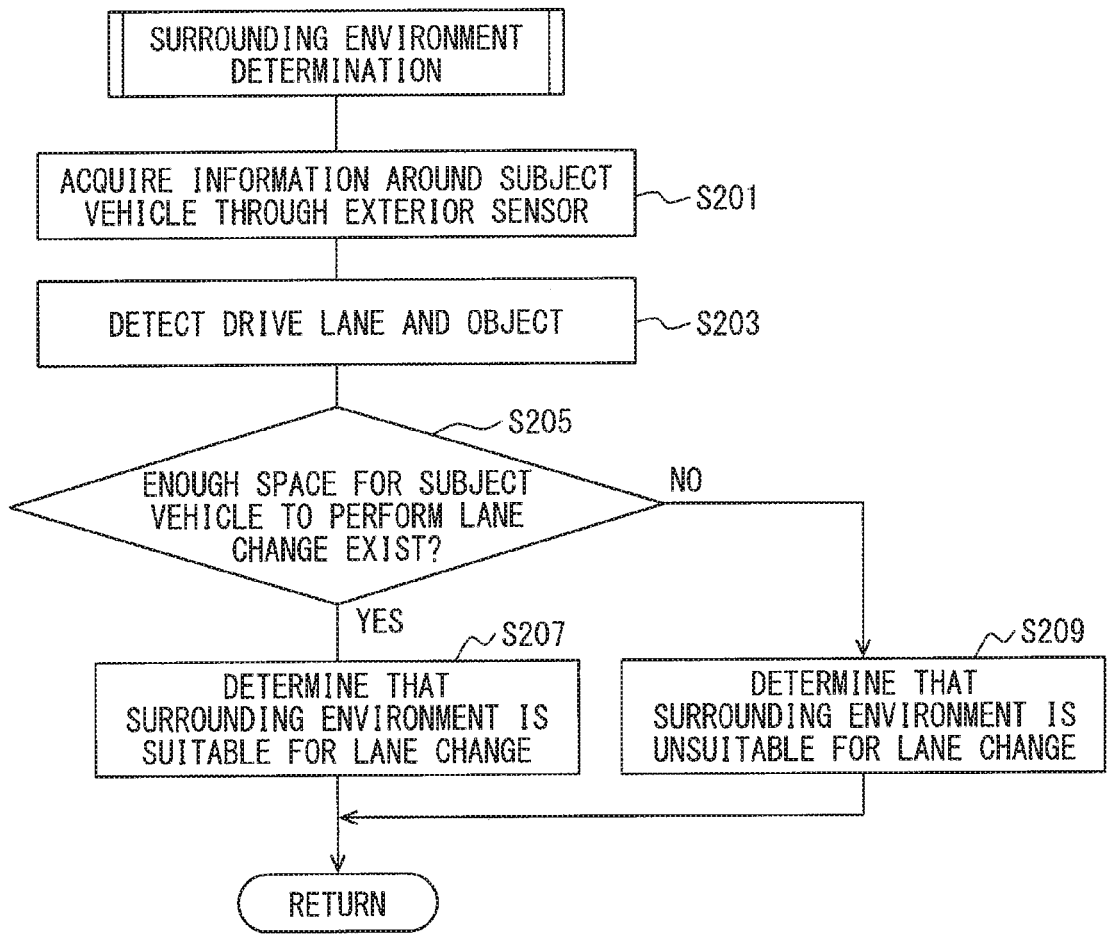
FIG. 6 is a flowchart illustrating a surrounding environment determination process.
Figure 7:
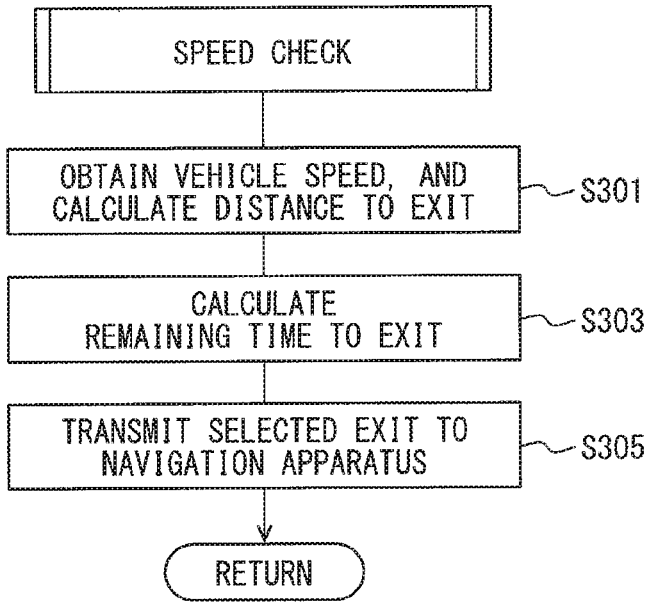
FIG. 7 is a flowchart illustrating a speed check process.

A route recalculation process will be explained with reference to FIG. 5 to FIG. 7. The route recalculation process performs recalculation if the subject vehicle during the AD mode has deviated from the original route. As an example, it is supposed that the driver initially sets a particular destination position, and the navigation apparatus 1 generates the original route from the current position (for example, home of the driver) to the destination position (for example, airport). It is further supposed that the subject vehicle drives in the AD mode along the original route, and it is supposed that the subject vehicle in the AD mode drives on freeway, and it is supposed that the subject vehicle has missed an exit guided by the original route due to some reason such as occurrence of traffic accident, existence of obstacles, or road construction.

At S100, the navigation apparatus 1 checks whether the subject vehicle drives along the original route. When it is determined that the subject vehicle drives along the original route (S100: NO), the process returns to S100. When the subject vehicle has deviated from the original route (S100: YES), the process moves to S200 and initiates the route recalculation process.

At S200, the surrounding environment determiner 3 determines the surrounding environment around the subject vehicle, and determines a possibility of lane change of the subject vehicle based on the detection result of the exterior sensor 21. The surrounding environment determination process will be explained below with reference to FIG. 6.

At S201, the surrounding environment determiner 3 acquires information around the subject vehicle through the exterior sensor 21.

At S203, a current drive lane, an adjacent drive lane, a dividing lane, and an object present on these lanes are detected.

At S205, it is determined whether there is enough space for the subject vehicle to perform lane change. The surrounding environment determiner 3 detects and calculates a space on the adjacent drive lane and a distance between vehicles driving on the adjacent lane. For example, when the exterior sensor 21 detects no vehicle on the adjacent lane, the surrounding environment determiner 3 determines that the surround environment is suitable for lane change. For example, when the exterior sensor 21 detects another vehicle on the adjacent drive lane, and when the enough space exists between vehicles, the surrounding environment determiner 3 determines that the surrounding environment is suitable for lane change. The enough space may be, for example, one and a half times the length of the subject vehicle or may be set by a driver to any arbitrary distance.

When it is determined that there is enough space for the subject vehicle to perform lane change (S205: YES), the process moves to S207. When it is determined that the enough space is not secured (S205: NO), the process moves to S209.

At S207, it is determined that the surround environment is suitable for lane change. At S209, it is determined that the surround environment is unsuitable for lane change. The determination result of S207 and S209 is transmitted to the navigation apparatus 1. After S207 or S209, the surrounding environment determination process terminates and the process moves to S300.

At S300, the navigation apparatus 1 performs the speed check process. The speed check process will be explained below with reference to FIG. 7.

At S301, the navigation apparatus 1 obtains vehicle speed information from the vehicle speed sensor 5, and identifies the closest next exit (corresponding to a first node) and the second closest next exit (corresponding to a second node) from the map database 13 and obtains information on a distance to each of the closest next exit and the second closest next exit. The distance to each of the closest next exit and the second closest next exit may be calculated based on the current position and the connection relation information of each of the closest next exit and the second closest next exit.

At S303, based on the current position and the calculated distance, a remaining time to each of the closest next exit and the second closest next exit is calculated. Here, the remaining time is a period of time when it is required to reach an exit. After calculation, it is determined whether the calculated remaining time is longer than a threshold value (corresponding to a sufficient time, or a time longer than a predetermined period of time). In other words, it is checked whether the subject vehicle is so close to an exit or not. When it is determined that the exit is too close, the exit is not selected for the AD mode from a perspective of safety and comfortability. According to this processing, it may be possible to prevent the navigation apparatus 1 from selecting an exit that is so close from the current position.

The threshold value may be 10 seconds, for example. Instead of the predetermined fixed threshold value, several threshold values that are associated with speed may be stored in the storage 6, and one of the values may be selected based on the vehicle speed. Alternatively, an expression that determines the threshold value based on the vehicle speed may be stored in the storage 6. The navigation apparatus 1 may calculate and obtain the threshold value.

At S305, the exit or the exits having the remaining time equal to or longer than the threshold value may be transmitted to the navigation apparatus 1. When information of multiple exits are transmitted to the navigation apparatus 1, information of an exit closer to the subject vehicle may be transmitted with a flag to indicate priority. The speed check process terminates, and the process moves to S400.

At S400, the route recalculation process recalculates an alternative route that enables to keep the AD mode, based on the current position, the destination position, the determination result of the surrounding environment determination process and the determination result of the speed check process. For example, when the determination result of the surrounding environment determination process shows that the surrounding environment is unsuitable for lane change, and a lane change is required for using the closest next exit, the navigation apparatus 1 does not select the closest next exit and instead, selects the second closest next exit. When the subject vehicle drives along the alternative route, it is possible to keep the AD mode. After generation of the alternative route, an estimated arrival time is re-calculated, and the process moves to S501. The estimated arrival time may be displayed on the human machine interface 12.

Process from S501 to S507 corresponds to the eagerness determination process. The eagerness determiner 4 performs the eagerness determination process. In the present embodiment, the eagerness of the driver may be measured as arrival time. For example, the driver may want to go to an airport on time. How long it will take to get there relates to the eagerness. In the present embodiment, the driver inputs the desired arrival time at the start of driving, in addition to the input of the destination position. The desired arrival time is stored in the navigation apparatus 1, for example.

At S501, the eagerness determiner 4 receives the desired arrival time of the driver and the recalculated estimated arrival time.

At S503, the eagerness determiner 4 compares the desired arrival time and the estimated arrival time, and determines whether the driver will arrive at the destination position by the desired arrival time. When it is determined that the driver will arrive at the destination position at or before the desired arrival time (S503: YES), the process moves to S507. By contrast, when it is determined that the driver will arrive at the destination position later than the desired arrival time (S503: NO), the process moves to S505.

At S505, it is determined that the driver eagerness is high, since the drive may not arrive at the destination position by the desired arrival time when the subject vehicle keeps the AD mode along the alternative route. After S505, the process moves to S700.

At S507, it is determined that the driver eagerness is not high. After S507, the process moves to S900.

Incidentally, the state where the driver eagerness is high corresponds to a state where the driver is in a high eagerness state. The state where the driver eagerness is not high corresponds to a state where the driver is in a non-high eagerness state.

At S700, the navigation apparatus 1 recalculates a route to the destination position to generate a fastest route. The navigation apparatus 1 recalculates the fastest route to the destination position without considering the determination result of the environment determination process and the speed check process. For example, when the alternative route selects the second closest next exit, the closest next exit is selected in the fastest route.

The estimated arrival time of the fastest route is equal to or earlier than the estimated arrival time of the alternative route. In some cases, the fastest route may be a route identical with the alternative route.

At S800, the controller 7 instructs the autonomous drive apparatus 2 to terminate the AD mode to switch to the MD mode with an active safety assistant system and/or a passive safety assistant system. Therefore, in a case where the eagerness of the driver is high (for example, a departure time of a flight approaches while going to an airport), the AD mode may be terminated and the driver may take back control for a manual drive mode, and the navigation apparatus may point out an exit while considering the eagerness of the driver.

At S900, the controller 7 maintains the AD mode and drives along the alternative route.

Therefore, according to the present disclosure, a navigation apparatus is configured to (i) initially suggest an original route when the driver sets the destination position, (ii)

suggest an alternative route with a first estimated arrival time when the vehicle deviates from the original route and an eagerness determiner determines that the driver is not in the predetermined high eagerness state, and (iii) suggest the fastest route with a second estimated arrival time, which is equal to or earlier than the first estimated arrival time, when the vehicle deviates from the original route and the eagerness determiner determines that the driver is in the predetermined high eagerness state. The controller is configured to (i) set an autonomous drive mode when the vehicle travels along the original route, (ii) maintain the autonomous drive mode when the vehicle deviates from the original route and the eagerness determiner 4 determines that the driver is not in the predetermined high eagerness state, and (iii) switch to a manual drive mode when the vehicle deviates from the original route and the eagerness determiner 4 determines that the driver is in the predetermined high eagerness state.

When the subject vehicle during the autonomous drive mode has deviated from the original route, and also when the driver is eager to arrive at the destination position, the controller of the driver assisting system instructs the autonomous drive apparatus to terminate the autonomous drive mode, so that the driver starts to drive the subject vehicle by himself/herself. Accordingly, it may be possible to meet the demand of the driver more properly. In some cases, the driver who is eager to arrive at the destination position wants to drive the subject vehicle. Thus, it may be possible to improve convenience for the driver.

In addition, when the subject vehicle deviates from the original route, and also when the driver is not so eager to arrive at the destination position, the controller determines that the subject vehicle keeps the autonomous drive mode. In this case, by considering the surrounding environment and the vehicle speed in addition the current position and the destination position, the navigation apparatus generates the alternative route that keeps the autonomous drive mode. Therefore, the driver does not need to drive the subject vehicle by himself/herself. It may be possible to improve convenience for the driver.

(Modifications)

(First Modification)

The eagerness of the driver may be determined based on name of the destination position such as the name of airport. For example, when the driver inputs the name of an airport as a destination position, the arrival time of the subject vehicle may be important, so that it is determined that the eagerness of the driver is high.

Specifically, a list of one or more positions may be registered as high eagerness destination position in the storage 6. The driver may add a new position to the list, and may delete a position registered in the list through the human machine interface 12. The eagerness determiner 4 searches in the eagerness determination process whether the list of positions includes the destination position. The eagerness determiner 4 determines that the driver is in the predetermined high eagerness state when the list includes the destination position.

(Second Modification)

The detector 41 may detect biological information of the driver sitting on, for example, a driver seat. The biological information may include pulse, and perspiration from hand of the driver. The eagerness determiner 4 determines the eagerness of the driver based on the detection results. For example, a pulse sensor may be placed on a steering wheel of the subject vehicle, or the inside of the driver seat. A perspiration of hand may be detected by a sensor placed on the steering wheel.

(Third Modification)

The eagerness of the driver may be determined based on switch or button operated by the driver. For example, the driver may input his/her eagerness through a switch or a button of the human machine interface 12. Alternatively, image of the switch or button may be displayed on a display of the human machine interface 12. The eagerness indicates what level of eagerness the driver has.

In the speed check process of the above embodiment, the remaining time to each of the closest next exit and the second closest next exit are calculated. The number of exits to be identified is not limited to two. The number of exits to be identified may be three or more. Alternatively, the speed check process may initially determine a remaining time to the closest exit. When the closest next exit is inappropriate, the speed check process may be operated again to calculate the second closest exit or the like.

In the above embodiment, a case when the subject vehicle during the AD mode has missed an exit on a freeway is described as an example of a case of recalculation. The present disclosure is not limited to this situation. The present disclosure may be applied to a case where the subject vehicle during the AD mode has missed an intersection, and a recalculation is required. Furthermore, the present disclosure may be applied to any case where the subject vehicle during the AD mode has deviated from the original route, and a recalculation is required.

The driver may be an example of a user in the present disclosure. The user may be a driver, a passenger.

Each of the environment determiner 3, the eagerness determiner 4, and the controller 7 may be configured by a processor.

It is noted that a flowchart or the process of the flowchart in the present application includes steps (also referred to as sections), each of which is represented, for instance, as S100. Further, each step can be divided into several sub-steps while several steps can be combined into a single step.

While the embodiments, the configurations, the aspects of the driver assisting system and the autonomous vehicle with the driver assisting system have been described by way of example, it should be appreciated that embodiments, configurations, aspects of the present disclosure are not limited to the respective embodiments, the respective configurations, and the respective aspects described above. For example, embodiments, configurations, aspects obtained by appropriately combining technical portions disclosed in different embodiments, configurations, and aspects are included within a range of embodiments, configurations, and aspects of the present disclosure.

What is claimed is:

1. A driver assisting system for a vehicle that is capable of operating in an autonomous drive mode and a manual drive mode, the driver assisting system comprising:

an autonomous drive apparatus that controls the vehicle during the autonomous drive mode;

a navigation apparatus that guides to a driver a route to a destination;

a detector that obtains information associated with an eagerness of the driver to arrive at the destination;

an eagerness determiner that determines whether the driver is in a predetermined high eagerness state based on the information obtained by the detector; and a controller that switches between the autonomous drive mode in which the autonomous drive apparatus drives the vehicle and the manual drive mode in which the driver drives the vehicle, wherein the navigation apparatus is configured to (i) suggest an original route when the driver sets the destination, (ii) suggest an alternative route with a first estimated arrival time when the vehicle deviates from the original route and the eagerness determiner determines that the driver is not in the predetermined high eagerness state, and (iii) suggest a fastest route with a second estimated arrival time, which is equal to or earlier than the first estimated arrival time, when the vehicle deviates from the original route and the eagerness determiner determines that the driver is in the predetermined high eagerness state, and the controller is configured to (i) set the autonomous drive mode when the vehicle travels along the original route, (ii) maintain the autonomous drive mode when the vehicle deviates from the original route and the eagerness determiner determines that the driver is not in the predetermined high eagerness state, and (iii) switch to the manual drive mode when the vehicle deviates from the original route and the eagerness determiner determines that the driver is in the predetermined high eagerness state.

2. The driver assisting system according to claim 1, wherein the detector includes an interface that receives a desired arrival time of the driver as the information associated with the eagerness of the driver, and the eagerness determiner determines that the driver is in the predetermined high eagerness state when the first estimated arrival time is later than the desired arrival time.

3. The driver assisting system according to claim 1, wherein the detector includes an interface that inputs the destination from the driver as the information associated with the eagerness of the driver, and the eagerness determiner determines that the driver is in the predetermined high eagerness state when the destination input from the driver is included in a predetermined position list.

4. The driver assisting system according to claim 1, wherein the detector includes a sensor that obtains biological information of the driver as the information associated with the eagerness of the driver, and the eagerness determiner determines whether the driver is in the predetermined high eagerness state based on the biological information obtained by the sensor after the vehicle deviates from the original route.

5. The driver assisting system according to claim 1, wherein the detector includes a switch operated by the driver to input an eagerness state of the driver, and the eagerness determiner determines whether the driver is in the predetermined high eagerness state based on an input operation to the switch by the driver.

6. The driver assisting system according to claim 2, further comprising a speed sensor that detects a vehicle speed of the vehicle, wherein the navigation apparatus specifies a first node and a second node along a road on which the vehicle is travelling when the vehicle deviates from the original route, the navigation apparatus calculates a remaining time until the vehicle reaches the first node, and the navigation apparatus sets the alternative route via the first node when the remaining time is longer than a threshold value, and the navigation apparatus sets the alternative route via the second node when the remaining time is equal to or shorter than the threshold value.

7. The driver assisting system according claim 6, further comprising a surrounding environment determiner that detects road conditions surrounding the vehicle, and determines whether the vehicle is able to change a current drive lane to another drive lane under the road conditions determined, wherein the navigation apparatus determines the alternative route based on the road conditions determined by the surrounding environment determiner.

8. The driver assisting system according to claim 6, wherein the first node and the second node are exits of freeway or intersections.

* * * * *